A. BURROUGHS.
Carpet-Fastener.
No. 159,153. Patented Jan. 26, 1875.
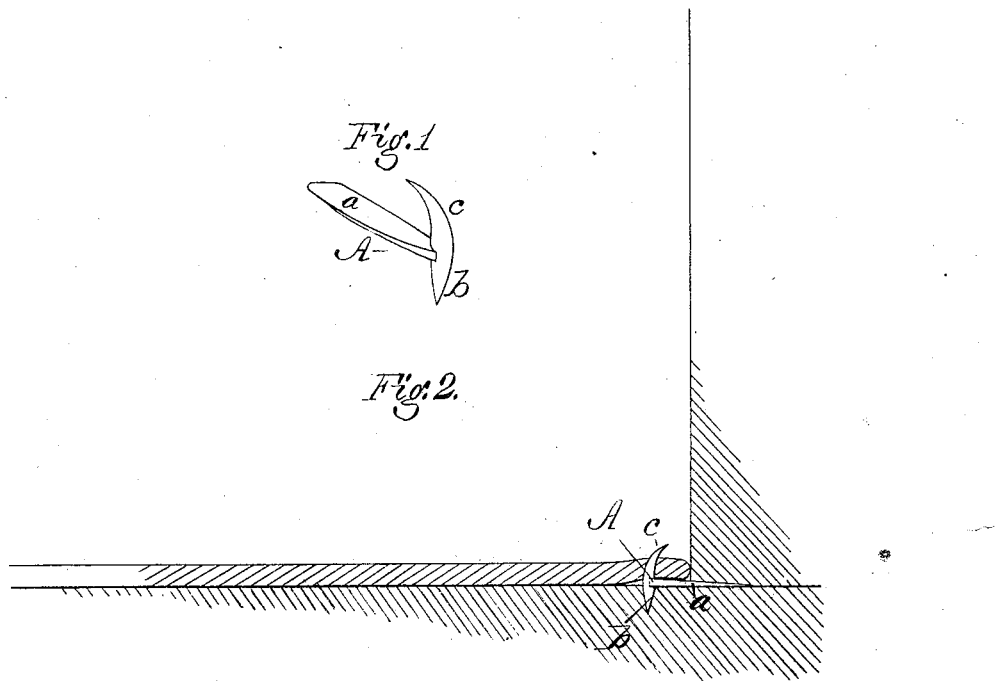

UNITED STATES PATENT OFFICE.

ALMA BURROUGHS, OF NUNDA STATION, NEW YORK.

IMPROVEMENT IN CARPET-FASTENERS.

Specification forming part of Letters Patent No. 159,153, dated January 26, 1875; application filed October 21, 1874.

*To all whom it may concern:*

Be it known that I, ALMA BURROUGHS, of Nunda Station, in the county of Livingston and State of New York, have invented certain Improvements in Carpet-Fasteners, of which the following is a specification:

My device consists simply in a small T-shaped piece of metal, having one arm to pass under the mop-board, a second arm to enter the floor, and a third one standing upright to receive and hold the edge of the carpet, as hereinafter described.

Figure 1 represents a perspective view of my device; Fig. 2, a view of the same in use.

A represents my device, made in one piece, with a flat sharp arm, $a$, to pass under the edge of the mop-board, a depending point, $b$, to enter the floor and hold the device from drawing out from under the mop-board, and an upright slightly-curved point, $c$, upon which to hook the edge of the carpet.

In applying the device, the flat sharp arm $a$ is driven into or under the mop-board, and then the body of the device driven down and the point $b$ forced its entire length into the floor, so that the arm $a$ rests on the floor, as shown in Fig. 2. The edge of the carpet, being then hooked over the upright point $c$, is held securely thereby. The carpet is readily secured and detached by the fingers. The strain of the carpet on the upright point tends to hold the point $b$ down in the floor, and thereby to secure the fastener in place.

The fasteners constructed as above are very simple, cheap, and reliable, are easily and quickly applied and removed, and permit the carpet to be put down or taken up in a very short space of time.

I am aware that it is not new to make a carpet-fastener consisting of a plate provided with two teeth to enter the floor, a hook on one end to hold the carpet, and an edge to enter the wash-board, as shown in the patent of Geo. G. Noyes, dated September 20, 1859, and I therefore make no claim, except to my device as shown, with its body flattened and widened at one end to a chisel-edge, which enters the wood readily and holds the device from tipping sidewise, and narrowed down toward its opposite end to the width of the two points or hooks, one above and the other below.

By giving the device the peculiar form shown, having only the single point to enter the floor, and having such point at the narrow end below the upper point or hook which holds the carpet, I am enabled to form it in a die, complete and finished in one stroke or operation, and thus to produce them rapidly and cheaply.

Having described my invention, what I claim is—

The carpet-fastener consisting of the body having one end widened, flattened, and brought to an edge, and the opposite end reduced in width and provided with a single point to enter the floor, and an upright point to receive the carpet, the device being made in one piece.

ALMA BURROUGHS.

Witnesses:
MILES H. WAKEMAN,
J. R. HAMILTON.